United States Patent
Evenson et al.

(10) Patent No.: US 10,942,912 B1
(45) Date of Patent: Mar. 9, 2021

(54) CHAIN LOGGING USING KEY-VALUE DATA STORAGE

(71) Applicant: Amazon Technologies, Inc., Seattle, WA (US)

(72) Inventors: Andrew Ross Evenson, Seattle, WA (US); Catalin Mihai Constantin, Seattle, WA (US); Dmitri Gluzman, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1025 days.

(21) Appl. No.: 15/192,776

(22) Filed: Jun. 24, 2016

(51) Int. Cl.
*G06F 16/23* (2019.01)
*G06F 16/215* (2019.01)

(52) U.S. Cl.
CPC ........ *G06F 16/2358* (2019.01); *G06F 16/215* (2019.01); *G06F 16/235* (2019.01); *G06F 16/2365* (2019.01)

(58) Field of Classification Search
None
See application file for complete search history.

(56) References Cited

U.S. PATENT DOCUMENTS

| | | |
|---|---|---|
| 6,148,338 A | 11/2000 | Lachelt et al. |
| 8,748,012 B2 | 6/2014 | Zeng et al. |
| 9,953,058 B1 * | 4/2018 | Sadri ................. G06F 16/24561 |
| 2016/0292672 A1* | 10/2016 | Fay ...................... G06Q 20/363 |
| 2016/0342989 A1* | 11/2016 | Davis .................. G06Q 20/385 |
| 2017/0031676 A1* | 2/2017 | Cecchetti .................. G06F 8/65 |
| 2017/0295232 A1* | 10/2017 | Curtis ..................... G06F 9/466 |
| 2017/0331896 A1* | 11/2017 | Holloway ............... H04L 67/12 |

OTHER PUBLICATIONS

Gwen Shapira, et al., "Apache Kafka for Beginners", Retrieved from URL: http://blog.cloudera.com/blog/2014/09/apache-kafka-for-beginners/, Sep. 2014, pp. 1-16.
Amazon Web Services, "Amazon Kinesis Streams Developer Guide", Updated Apr. 19, 2016, pp. 1-136.
Jef Barr, "Sneak Preview—DynamoDB Streams", Retrieved from URL: https://aws.amazon.com/blogs/aws/dynamodb-streams-preview/, Nov. 2014, pp. 1-4.

* cited by examiner

*Primary Examiner* — Aleksandr Kerzhner
*Assistant Examiner* — Eddy Cheung
(74) *Attorney, Agent, or Firm* — Robert C. Kowert; Kowert, Hood, Munyon, Rankin & Goetzel, P.C.

(57) ABSTRACT

Methods, systems, and computer-readable media for chain logging using key-value data storage are disclosed. A chain is generated that represents a plurality of events in chronological order. The chain comprises a head and one or more nodes. The head and the one or more nodes are stored in a persistent data store as a plurality of key-value pairs. For a request to add data indicative of a new event to the chain, the head is updated in the data store to include the data indicative of the new event.

20 Claims, 11 Drawing Sheets

CHAIN LOGGING USING KEY-VALUE DATA STORAGE

BACKGROUND

Many companies and other organizations operate distributed systems that interconnect numerous computing systems and other computing resources to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization and public data centers that are operated by entities as businesses to provide computing resources to customers. As the scale and scope of typical distributed systems has increased, the tasks of provisioning, administering, and managing the computing resources have become increasingly complicated.

Such a distributed system may encompass numerous subsystems that work in concert. For example, a distributed system operated by an online merchant may include an ordering system that processes the generation and modification of customer orders of goods and/or services. The same distributed system operated by the online merchant may also include a logging system that stores log entries related to orders. When a modification to an order is desired, a log entry may be generated using the logging system to create a persistent record of the order modification. If the logging system is offline, aspects of the ordering system may be unavailable or broken due to the dependency between the ordering system and the logging system. Such downtime may cause the online merchant to lose sales. Accordingly, it is desirable to provide a logging system with both high availability and durability.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for implementing chain logging using key-value data storage are described. A chain, also referred to herein as a buffer chain, may represent a highly available, low latency, and durable log for events produced by multiple event producers. The log may be appended to at the head, iterated in either direction, and truncated at the tail. A chain may include a head and an additional set of nodes. The head and the nodes may be stored in a persistent key-value data store. New events are first added to the head and can eventually be offloaded in new nodes. To prevent the same event from being logged twice, events may be associated with event IDs that are checked before logging can occur. Multiple entities can concurrently access the chain, e.g., to add new events. In this manner, a highly available and durable logging system may be provided for clients.

Figure 1A:
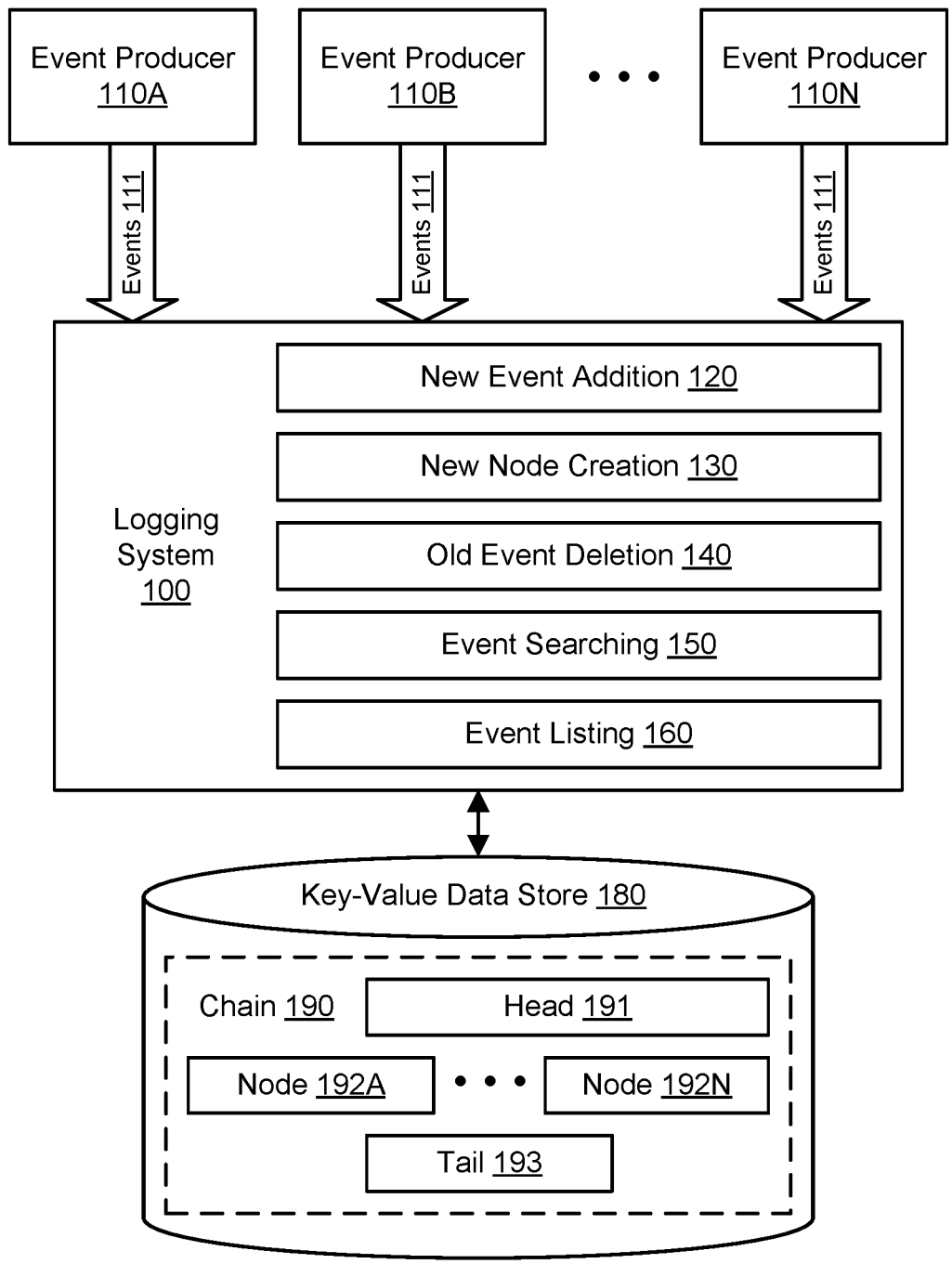
FIG. 1A illustrates an example system environment for chain logging using key-value data storage, according to one embodiment.

FIG. 1A illustrates an example system environment for chain logging using key-value data storage, according to one embodiment. A logging system 100 may capture data indicative of events 111 in a particular order in a chain 190. The data indicative of events 111 may also be referred to simply as events, and a log entry representing an event may be referred to as an element of the chain. Events 111 may represent transactions, status changes, status reports, and/or other updates with respect to one or more systems, data sets, data stores, and/or any other suitable items. For example, the events 111 may relate to financial transactions, orders in a marketplace, accounting transactions, updates to gift card balances, and so on. The events 111 may be generated and provided to the logging system 100 by a plurality of event producers 110A-110N. Although three event producers 110A, 110B, and 110N are shown for purposes of illustration and example, it is contemplated that any suitable number and configuration of event producers may be used to feed events to the logging system 100. The event producers 110A-110N and other clients of the logging system 100 may represent different processes, systems, and/or computing devices. The event producers 110A-110N and other clients of the logging system 100 may be distributed on multiple computing devices throughout one or more networks, including private networks and/or public networks such as the Internet. The event producers 110A-110N and other clients of the logging system 100 may also be coupled to the logging system 100 through one or more networks, including private networks and/or public networks such as the Internet. As will be discussed in greater detail below, the event producers 110A-110N and other clients of the logging system 100 may interact with the logging system 100 using one or more suitable interfaces, such as one or more application programming interfaces, e.g., to invoke the functionality of the logging system.

The key-value data store 180 may store key-value pairs using any suitable storage technology. The keys may represent identifiers of portions of the chain 190, and the corresponding values may represent the contents of those portions (including elements that represent events). In one embodiment, the key-value data store 180 may represent a distributed hash table (DHT). To store key-value pairs, the DHT may be implemented as a decentralized system that offers a lookup service similar to a hash table. In on embodiment, any participating node of the DHT may efficiently retrieve the value associated with a given key. The DHT may scale to very large numbers of nodes and may be capable of handling node arrivals, node departures, and node failures. In one embodiment, the key-value data store 180 supports operations such as conditional put, conditional delete, and get in order to interact with the logging system 100.

The chain 190 may capture various sequences of the events 111 in respective portions of the chain. In one embodiment, the chain 190 may include a head 191 and a plurality of nodes 192A-192N. Although the nodes 192A-192N are shown for purposes of illustration and example, it is contemplated that any suitable number and configuration of nodes (from zero for a relatively new chain to a large number for a more mature chain) may be part of a particular chain. The chain 190 may also include a tail 193 that indicates a point at which older elements in the chain have been deleted and/or marked for deletion. The nodes 192A-192N may be arranged in a particular order, such as a chronological order. In one embodiment, the chronological order may be based (at least in part) on the different times at which new events are received by the logging system 100 and added to the head 191 of the chain 190. Elements may be added to the head of the chain in a first-in, first-out manner. The head 191 may typically store newer elements before those elements are offloaded to the nodes 192A-192N. The nodes 192A-192N may typically store older elements that have been offloaded from the head 191. In this manner, the logging system 100 may limit the addition of new elements to the head 191. In one embodiment, elements may be deleted only from the oldest and least recent end of the chain 190, e.g., among one or more contiguous nodes containing elements previously offloaded from the head 191. In this manner, the logging system 100 may limit mutation of the chain 190 to either end and prevent alterations to the middle of the chain. The chain 190 is shown for purposes of illustration and example. The logging system 100 may maintain many chains other than the chain 190 illustrated in FIG. 1A. The other chains may be maintained in the same data store 180 or in other data stores of the same type or of a different type.

The head 191, nodes 192A-192N, and tail 193 for the particular chain 190 may be stored persistently in the key-value data store 180. For example, in the data store 180, the key for the head 191 may be based (at least in part) on (e.g., as a hash of) a chain identifier for the chain 190. The chain identifier (or chain ID) may be considered unique to the particular chain 190, at least in some context relevant to the logging system 100. The keys for the nodes 192A-192N may also be based (at least in part) on (e.g., as a hash of) a chain identifier for the chain 190, but the keys for the nodes may also be based (at least in part) on (e.g., as a hash of) an indicator of a position in the order of the chain. For example, if the chain identifier is "chain1," the identifier of the head 191 in the chain 190 may include the string "chain1:head," and the key for the head in the data store 180 may include that string or may be derived from that string (e.g., as a hash of the string).

Similarly, the key for a node may be based (at least in part) on the chain identifier and an indicator of the node's position in the sequence such as a node index. For the chain identifier "chain1," the identifier of the oldest node in the chain order (e.g., node 192A) may include the string "chain1:0," the identifier of the second oldest node in the chain order may include the string "chain1:1," the identifier of the third oldest node in the chain order may include the string "chain1:2," and so on. In the key-value data store 180, the keys for the nodes may include those strings or may be derived from those strings (e.g., as a hash of the string). For the chain identifier "chain1," the identifier of the tail 193 in the chain may include the string "chain1:tail," and the key for the tail in the data store 180 may include that string or may be derived from that string (e.g., as a hash of the string). Accordingly, the keys for the nodes 192A-192N in the key-value data store 180 may indicate the relative positions of the nodes in a particular order (e.g., a chronological order) that is captured in the chain 190. In one embodiment, a node may be keyed by the chain identifier and additional information that indicates the node's position in the sequence such as a combination of the sequence contents, position, and sequence index.

Any of the nodes 192A-192N may be retrieved from the data store 180 independently of any other node, given knowledge of the chain identifier and the node index (or other indicator of the node's position in the sequence). In one embodiment, the keys for the head 191, nodes 192A-192N, and/or tail 193 may also include or be derived from (e.g., as a hash of) an identifier of a client who "owns" the chain and potentially one or more other values. For example, the key for the head 191 may include or be derived from the string "clientname1:chain1:head" or the string "clientname1:projectname1:chain1:head."

The logging system 100 may include various components or functionalities. In one embodiment, the logging system 100 may include a component for new event addition 120. In one embodiment, the logging system 100 may include a component for new node creation 130. In one embodiment, the logging system 100 may include a component for old event deletion 140. In one embodiment, the logging system 100 may include a component for event searching or seeking 150. In one embodiment, the logging system 100 may include a component for event listing 160.

It is contemplated that the logging system 100 may include additional components not shown, fewer components than shown, or different combinations, configurations, or quantities of the components shown. The logging system 100 may comprise one or more computing devices, any of which may be implemented by the example computing device 5000 illustrated in FIG. 7. In various embodiments, portions of the logging system 100 may be provided by the same computing device or by any suitable number of different computing devices. If any of the components of the logging system 100 are implemented using different computing devices, then the components and their respective computing devices may be communicatively coupled, e.g., via a network. Each of the illustrated components may represent any combination of software and hardware usable to perform their respective functions.

In one embodiment, the functionality of the logging system 100 may be provided to event producers 110A-110N and other clients as a web-accessible service. The functionality of the logging system 100 may be presented to clients using a provider network. A network set up by an entity such as a company or a public sector organization to provide one or more services (such as various types of cloud-based computing or storage) accessible via the Internet and/or other networks to a distributed set of clients may be termed a provider network. A provider network may include numerous data centers hosting various resource pools, such as collections of physical and/or virtualized computer servers, storage devices, networking equipment and the like, that are used to implement and distribute the infrastructure and services offered by the provider. The resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network in different embodiments, including general purpose or special purpose computer servers, storage devices, network devices, and the like.

Figure 1B:
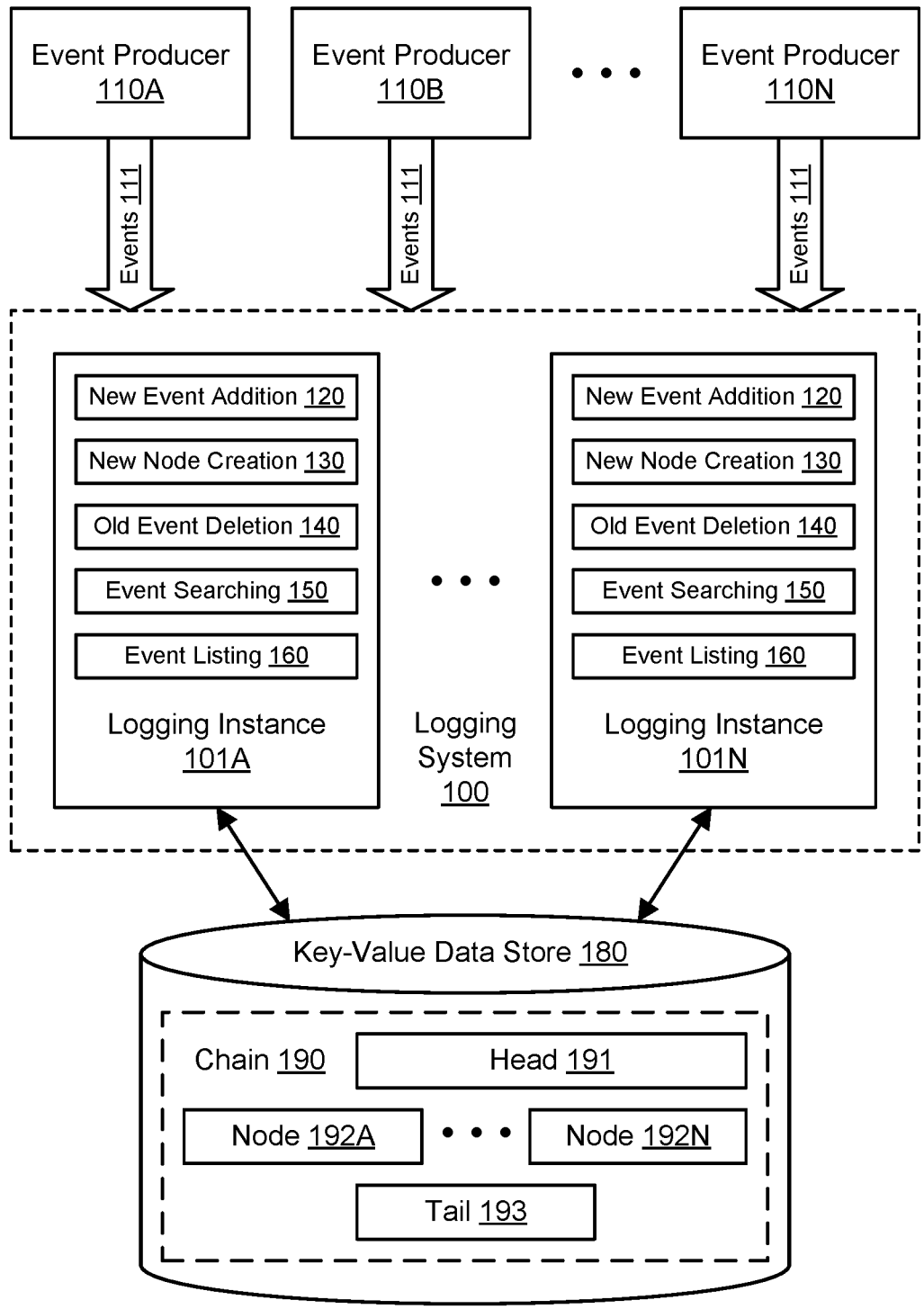
FIG. 1B and FIG. 1C illustrate an example system environment for chain logging using key-value data storage, including a distributed set of logging instances, according to one embodiment.
Figure 1C:
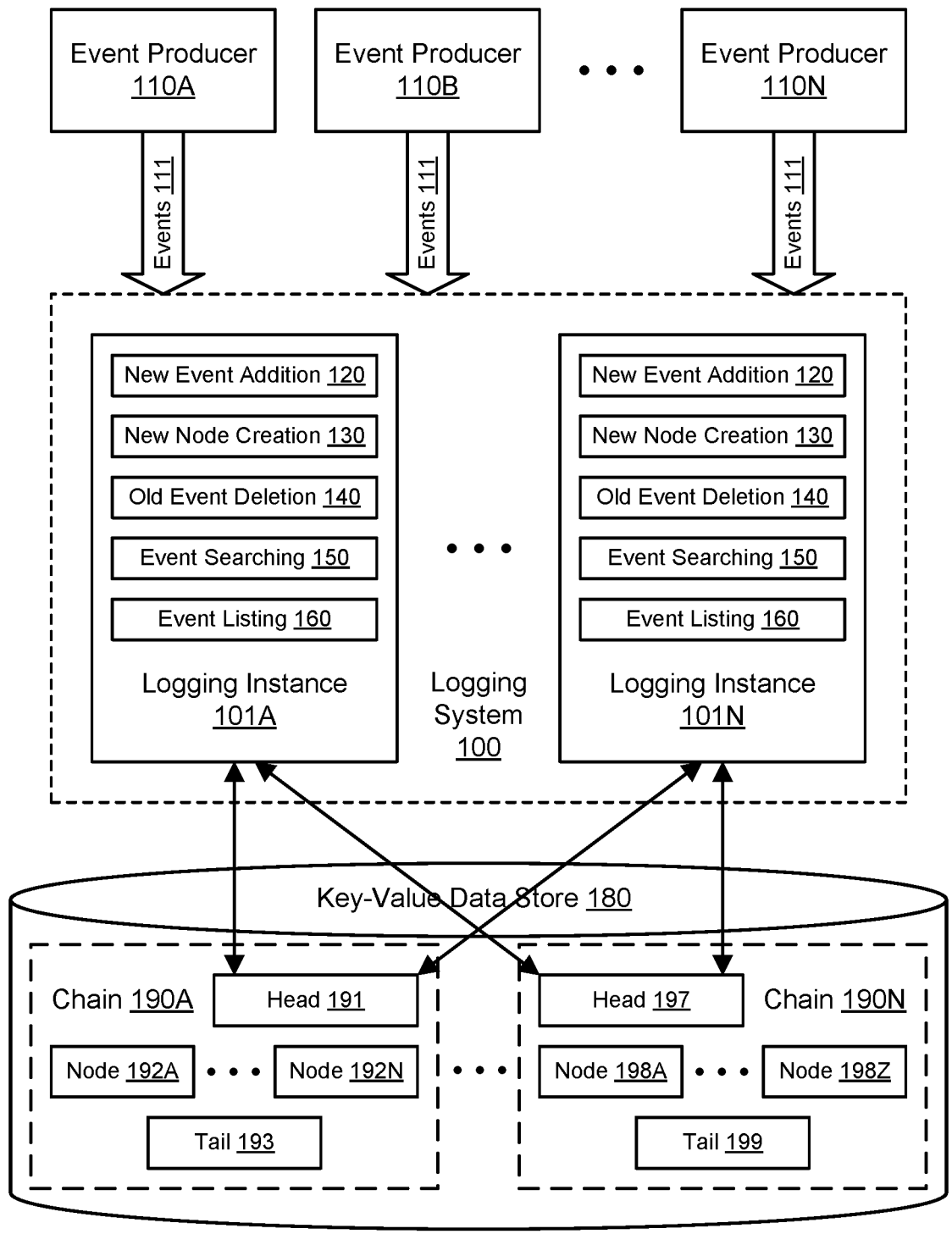

In various embodiments, the functionality of the logging system 100 may be centralized or distributed. For a more centralized system, a load balancer (or fleet of load balancers) may be used to receive logging requests from event producers and other clients and forward those requests to individual logging hosts in a fleet. FIG. 1B and FIG. 1C illustrate an example system environment for chain logging using key-value data storage, including a distributed set of logging instances, according to one embodiment. The functionality of the logging system 100 may be distributed as a plurality of logging instances such as instances 101A through 101N. Although two logging instances 101A and 101N are shown for purposes of illustration and example, it is contemplated that any suitable number and configuration of logging instances may be used to implement the logging system 100. The logging instances 101A-101N may represent different hosts. The logging instances 101A-101N may be distributed on multiple computing devices throughout one or more networks, including private networks and/or public networks such as the Internet. In one embodiment, at least some of the functionality of the logging system 100 may be implemented as a library of functions, and the logging instances 101A-101N may represent implementations of the library. For example, the event producers 110A-110N may represent programs that include the library in their program code. Using the distributed logging system 100 as implemented using the logging instances 101A-101N, multiple entities may access the chain 190 concurrently, e.g., to read elements from the chain, delete elements from the chain, iterate through the chain, search in the chain, and so on. The distributed nature of the logging system 100 as shown in FIG. 1B may enable many logging instances to read a large chain more quickly than a single logging instance could perform the same task.

In some embodiments, a plurality of entities within the logging system 100 may access a plurality of chains concurrently, e.g., to read elements from the chains, delete elements from the chains, iterate through the chains, search in the chains, and so on. As shown in the example of FIG. 1C, a plurality of logging instances 101A-101N may access a plurality of chains. The chains may include any suitable number of chains from chain 190A to chain 190N. As discussed above with respect to chain 190A, chain 190N may also include a head 197, a set of nodes 198A-198Z, and a tail 199. The set of nodes 198A-198Z may vary in number from the nodes 192A-192N in the other chain 190A. The example of FIG. 1C illustrates the logging instance 101A accessing (or attempting to access) the heads of two chains 190A and 190N (e.g., to add elements) while the logging instance 101N is also accessing (or attempting to access) the heads of the two chains 190A and 190N (e.g., to add elements). Because updates to the heads 191 and 197 in the data store 180 may be performed with conditional put operations, some updates may fail and require a head to be reloaded by an instance while multiple logging instances are attempting to update the same head over a small window of time. In one embodiment, locks on a head need not be acquired due to the use of a conditional put for head updates. In this manner, the logging system 100 may permit many-to-many relationships between logging instances 101A-101N and chains 190A-190N.

Using the component for new event addition 120, a request from an event producer may be processed by the logging system 100 to add a new event (e.g., data indicative of the event) to the head 191 of the chain 190. The request may represent a request to push, append, or add one or more elements to the chain. In one embodiment, new events may be added only to the head 191 first before potentially being offloaded to individual ones of the nodes 192A-192N. In one embodiment, suitable access credentials may be required before a request to add an element is processed.

Using the component for new node creation 130, a new node may be automatically created and stored in the data store 180. The new node may include a sequence of one or more elements previously added to the head 191. Once offloaded to the new node, the sequence of elements may be deleted from the head at any suitable time. The new node may be associated with a node index that indicates the position of the node in a sequential order of events. A key for the new node in the data store 180 may include or be derived from the chain identifier of the chain 190 and the node index.

Using the component for old event deletion 140, a request from a client of the logging system 100 may be processed by the logging system to remove one or more of the oldest events event (e.g., data indicative of the event) from the nodes 192A-192N of the chain 190. The request may represent a request to pop, truncate, remove, or delete one or more elements from the chain. In one embodiment, elements may be removed only from the oldest end of the chain, e.g., in one or more nodes that were created the furthest back in time. In one embodiment, elements may be removed only from one or more nodes having the lowest node index or indices. In one embodiment, one or more older elements may be removed from an oldest remaining node while one or more newer elements may remain in the node. The tail 193 may be used to track which elements have been marked for logical deletion and which elements have actually been physically deleted, e.g., from the data store 180. In one embodiment, suitable access credentials may be required before a deletion request is processed.

Using the event searching or seeking 150, a request from a client of the logging system 100 may be processed by the logging system to search over the chain 190. In one embodiment, the search may represent a k-ary search that divides the nodes 192A-192N into k+1 segments of roughly equal size and returns k nodes on the borders of those segments. For example, for a binary search (e.g., based on an input value k=1 or a default search), the nodes 192A-192N may be divided into two segments of roughly equal size, and the search may return a single node in the middle of the chain. In one embodiment, suitable access credentials may be required before a search request is processed.

Using the component for event listing 160, a request from a client of the logging system 100 may be processed by the logging system to list a contiguous sequence within the chain 190. In one embodiment, the list operation may list elements from nodes (and potentially from the head) either forwards or backwards in order. The individual nodes may be retrieved from the data store 180 based on the chain identifier and the node indices, e.g., when the keys for the nodes include or are derived from a combination of the chain identifier and the node indices. In one embodiment, suitable access credentials may be required before a list request is processed.

The logging system 100 may perform mutating operations (e.g., addition and deletion) in a first-in, first-out manner. The logging system 100 may perform read operations using random access and/or sequential access. The logging system 100 may be especially useful for maintaining logs in many types of domains, including financial transaction logs, job processing logs, event stream logs, and so on. The logging system 100 and logging instances 101A-101N may represent stateless components with persistence managed by the data store 180. In one embodiment, the logging instances 101A-101N may not coordinate with one another. For a single chain, the availability for the logging system 100 as a whole may be equivalent to the availability of a single file (representing the head of a chain) in the data store 180. For many chains, the availability for the logging system 100 as a whole may be equivalent to the availability of the underlying data store 180. For stateful clients (e.g., clients that can pass in the result of the last put to a chain), the latency of the logging system 100 may be equivalent to a single conditional put to the data store. By storing the elements in multiple records, the logging system 100 may scale to chains of an indefinitely large size if the underlying data store 180 permits. By storing nodes with a sequential numbering scheme, random access of nodes may be performed without a need to link from node to node or without a need to keep the nodes linked within the head or otherwise synchronized with the head.

The durability of the logging system 100 may be derived from that of the key-value data store 180. Because nodes can be named sequentially based on node indices, loss of part of the chain may not corrupt the rest of the chain. Optional mirroring of data in k nodes may be implemented so that a loss of k–1 nodes may not result in data loss. To implement mirroring, extra sequences may be retained in the head and in each node as the sequences are offloaded. The internal nodes may continue to be keyed on the sequence index of the highest sequence they contain. To page over the contents, every k nodes may be loaded instead of each sequential node. The availability of the data as well as the durability and cost for read operations maybe increased by a factor of k. The optional mirroring may retain the convenience of correctness, complexity, and consistency maintained internally within the chain.

Figure 2:
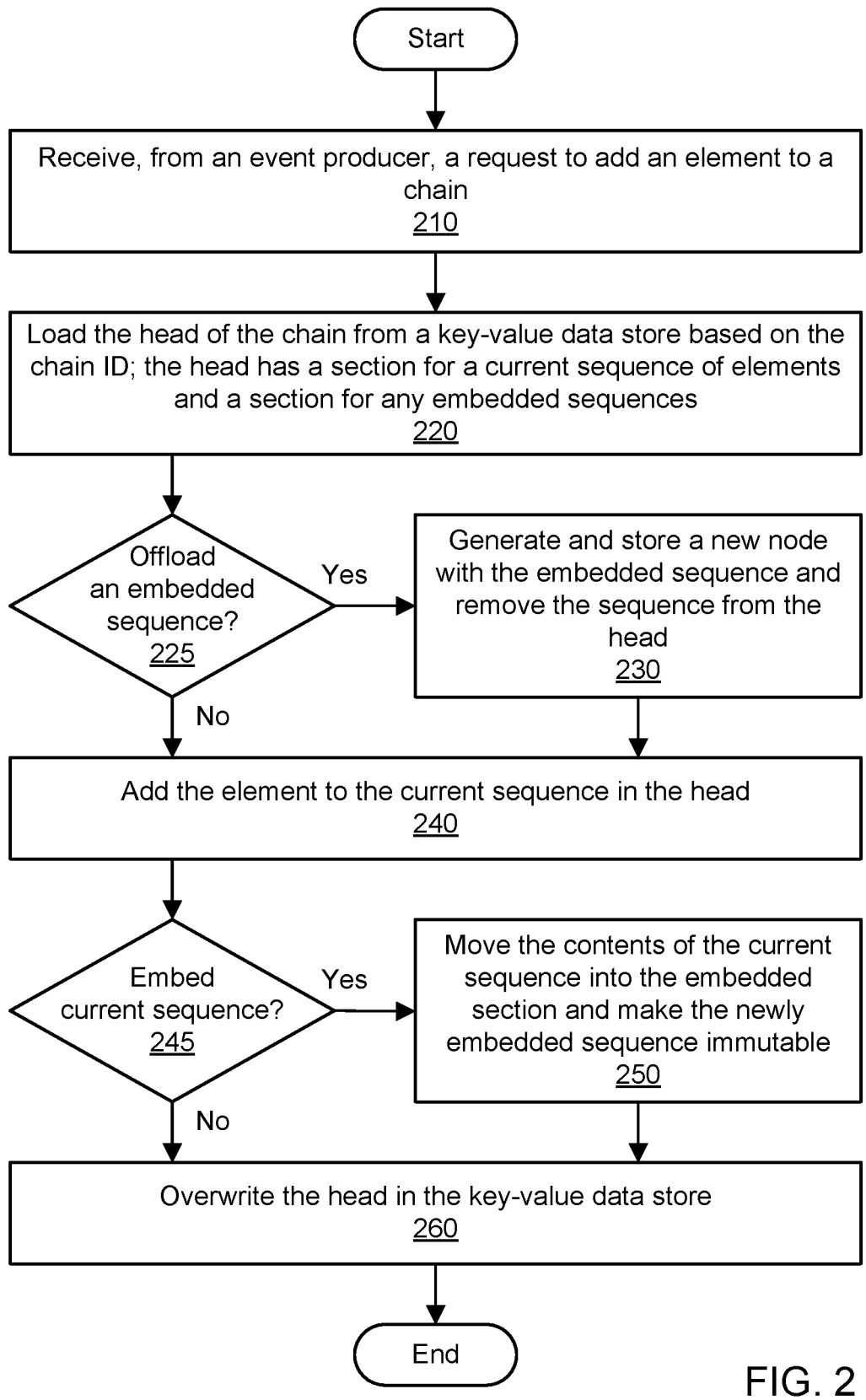
FIG. 2 is a flowchart illustrating a method for adding an element to the head of a chain, according to one embodiment.

FIG. 2 is a flowchart illustrating a method for adding an element to the head of a chain, according to one embodiment. At least some of the operations shown in FIG. 2 may be performed by a logging system. As shown in 210, a request to add an element to a chain may be received, e.g., from an event producer that is a client of the logging system. The element may correspond to an event in a stream of events. The element may represent a transaction, status change, status report, and/or other update with respect to one or more systems, data sets, data stores, and/or any other suitable items. For example, the element may correspond to and/or describe a financial transaction, an order in a marketplace, an accounting transaction, an update to a gift card balance, and so on. The request to add the element may indicate a chain identifier and the contents of the element.

As shown in 220, the head of the chain may be loaded from a key-value data store. The key by which the head is retrieved may include or be derived from (e.g., as a hash of) the chain identifier supplied in the request. In one embodiment, the key for the head may also include or be derived from an identifier of the client that sent the request and that has access privileges to add to the chain. If the head is not found in the data store, then the head may be created. The head may include a current section and an embedded section. Either section may be populated or may be empty when the head is loaded. The current section may include a sequence of one or more earlier events that were previously added to the head. The embedded section may include one or more even earlier sequences that were previously added to the head, and each of the embedded sequences may include one or more events. Sequences in the embedded section may be considered immutable and ready to be offloaded to the nodes that represent the body of the chain. Each element may be associated with an element index that indicates the relative position of the element in an order, e.g., the order in which new events are received by the logging system and added to the head of the chain. Each sequence in the embedded section may be associated with a sequence index that indicates the relative position of the sequence in an order, e.g., the order in which new sequences are moved or "graduated" to the embedded section in the head of the chain.

As shown in 225, it may be determined whether any embedded sequence(s) in the head should be offloaded to their own nodes. Offloading refers to the process of moving one or more elements from the head to a node of the chain. The determination to offload an embedded sequence from the embedded section to its own node may be based on any suitable factors. In one embodiment, any embedded nodes may be offloaded at the next push operation rather than proactively offloaded at the time of embedding. In one embodiment, an embedded sequence may be offloaded when the embedded section has passed a predetermined size threshold. In one embodiment, an embedded sequence may be offloaded when a predetermined duration of time has passed since the embedded sequence was added to the embedded section. In one embodiment, an embedded sequence may be offloaded when a predetermined number of sequences have been added to the embedded section.

If so, then as shown in 230, for each embedded sequence that is to be offloaded, a new node may be generated that includes the embedded sequence of elements. The new node may be stored in the key-value data store. The embedded sequence may be removed from the head at any suitable time after the new node is successfully stored in the data store, e.g., in any subsequent push of new elements to the head. In the data store, the key for the node may include or be derived from (e.g., as a hash of) the chain identifier and a node index that indicates the relative position of the node in the order of the chain. In one embodiment, the key for the head may also include or be derived from an identifier of the client that sent the request and that has access privileges to add to the chain. The value associated with the key may include the sequence of elements that is offloaded.

As shown in 240, the element associated with the request may be added to the current sequence in the head. The element may be added in an order with respect to any other elements in the current sequence, e.g., the order in which new events are received by the logging system. The new element may be associated with an element index that indicates the relative position of the element in the order.

As shown in 245, it may be determined whether the current sequence in the head (if any) should be embedded in the head. The determination to move the sequence from the current section to the embedded section may be based on any suitable factors. In one embodiment, the current sequence may be embedded when it has passed a predetermined size threshold. In one embodiment, the current sequence may be embedded when a predetermined duration of time has passed since the first element in the current sequence was added. In one embodiment, the current sequence may be embedded when a predetermined number of elements have been added to the current sequence. If so, then as shown in 250, the contents of the current sequence may be moved to the embedded section as an embedded sequence and made immutable; the contents of the current sequence may be removed from the current section once in the embedded section. Once the elements in the sequence are made immutable, their membership and order in the sequence may not be changed. When the sequence is embedded, it may be associated with a node index or other node identifier. The node indices may be numbered sequentially, and the head may keep track of the last index so that the next embedded sequence can be assigned the next number in the sequence. The operations shown in 225 and 230 may be performed prior to the operations shown in 245 and 250 so that an embedded sequence is persisted in at least one update of the head before being offloaded in another update of the head.

As shown in 260, the head may be overwritten in the data store with the updated head. The key for the head may remain the same, but the value associated with that key may be changed. The head may be overwritten with a conditional put operation in the data store. The updated head may now include (in the current section) the element associated with the request. If the current sequence prior to the addition of the new element was embedded, then the updated head may reflect that shift from the current section to the embedded section. If any embedded sequence was successfully offloaded, then the updated head may reflect the deletion of that sequence. In this manner, new elements in the chain may be added to the head first before eventually being offloaded to individual nodes.

Figure 3A:
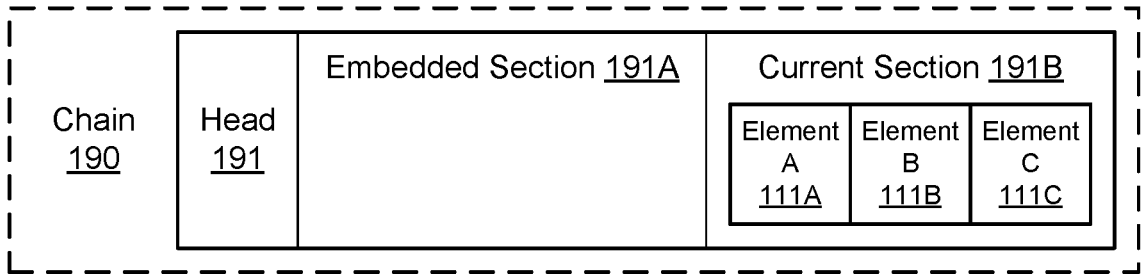
FIG. 3A through FIG. 3E illustrate examples of chains, according to one embodiment.

FIG. 3A through FIG. 3E illustrate examples of chains, according to one embodiment. As shown in the example of FIG. 3A, a chain 190 may include a head 191 and no nodes. The head may include an embedded section 191A and a current section 191B. The embedded section may be empty. The current section may include three elements, in order from oldest to newest (based, e.g., on the time of receipt by the logging system): element "A" 111A, element "B" 111B, and element "C" 111C.

Figure 3B:
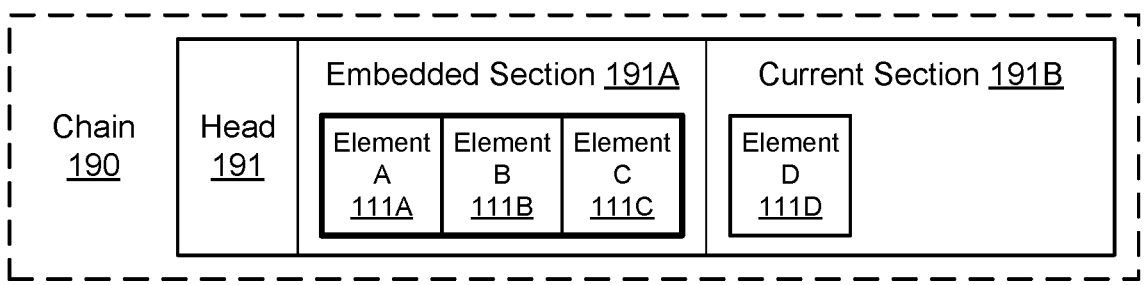

As shown in the example of FIG. 3B, a request may be received to add an element "D" 111D to the head. As discussed above with respect to FIG. 2, the sequence of elements A, B, and C 111A-111C may be moved from the current section to the embedded section and made immutable in terms of the composition and order of the sequence. When the sequence 111A-111C is embedded, it may be associated with a node index or other node identifier. The node indices may be numbered sequentially, and the head 191 may keep track of the last index so that the next embedded sequence can be assigned the next number in the sequence. In one embodiment, embedded sequences and the nodes created from them may vary in their number of elements. In one embodiment, embedded sequences and the nodes created from them may have a fixed number of elements; by enforcing a uniform number of elements per node, searches throughout the body of the chain may be performed by element identifier and not necessarily node identifier. Once the current section has been cleared in this manner, the new element D 111D may be added to the current section.

Figure 3C:
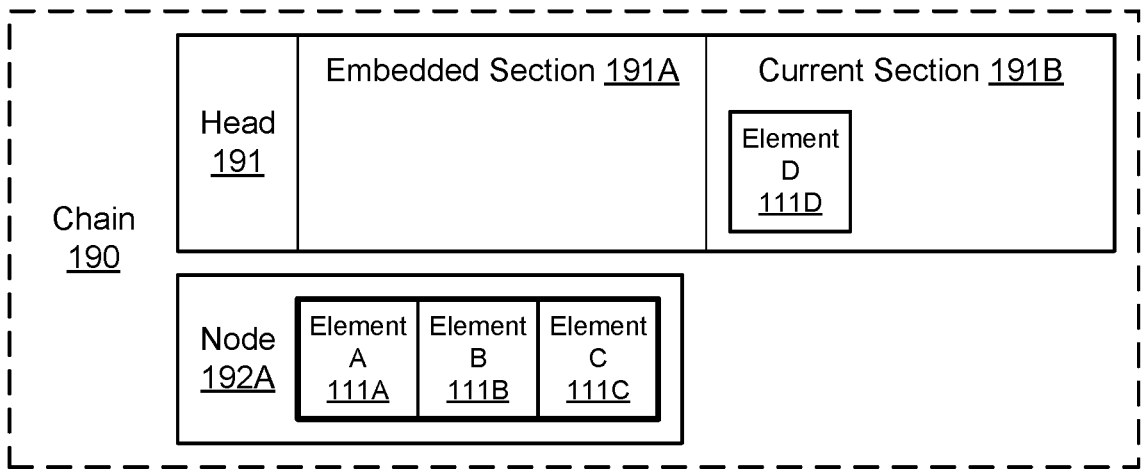

As shown in the example of FIG. 3C, the embedded sequence of elements A, B, and C 111A-111C may be offloaded from the head to the node 192A at some point. Again, the sequence in the node 192A may be considered immutable in terms of its composition and order. The node 192A may be the first created node for this chain and may be associated with a node index of 0 (or otherwise the lowest available index number). The sequence in the node 192A may be the earliest sequence for this chain and may be associated with a sequence index of 0 (or otherwise the lowest available index number). Each element within the node 192A may be associated with an element index, e.g., element index 0 for element A, element index 1 for element B, and element index 3 for element C. The comprehensive current state of the chain (e.g., of its contents and order) may be acquired from the head and any nodes currently in the chain: the ordered sequence of elements A-C as found in the earliest (and only) node 192A and the newest element D as found in the head 191.

Figure 3D:
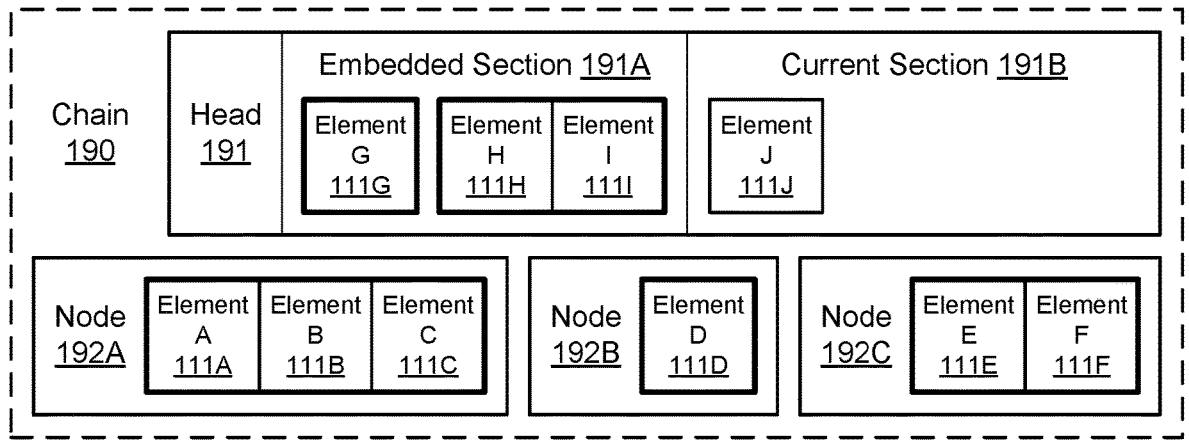

As shown in the example of FIG. 3D, additional elements have been offloaded to individual nodes after first being added to the head as described above. The chain now includes three nodes: the oldest node 192A as described previously, a second oldest node 192B containing element D, and a third oldest node 192C containing a sequence of elements "E" 111E and "F" 111F. In addition, the head includes an embedded sequence containing only the element "G" 111G and a newer embedded sequence containing the elements "H" 111H and "I" 111I. The head also includes a current sequence of one element, the newest element "J" 111J. The two embedded sequences are ready to be offloaded to individual nodes at any suitable time. The comprehensive current state of the contents and order of the chain may be acquired from the head and any nodes currently in the chain, in order from oldest to newest: the ordered sequence of elements A-C as found in the oldest node 192A, the element D in the second oldest node 192B, the ordered sequence of elements E and F as found in the third oldest node 192C, the embedded sequence with element G in the head, the embedded sequence with elements H and I in the head, and the newest element J in the current section of the head. As discussed above, the nodes 192A-192C may be stored in the key-value data store 180 using keys that include or are derived from the chain identifier and the respective node index.

Figure 3E:
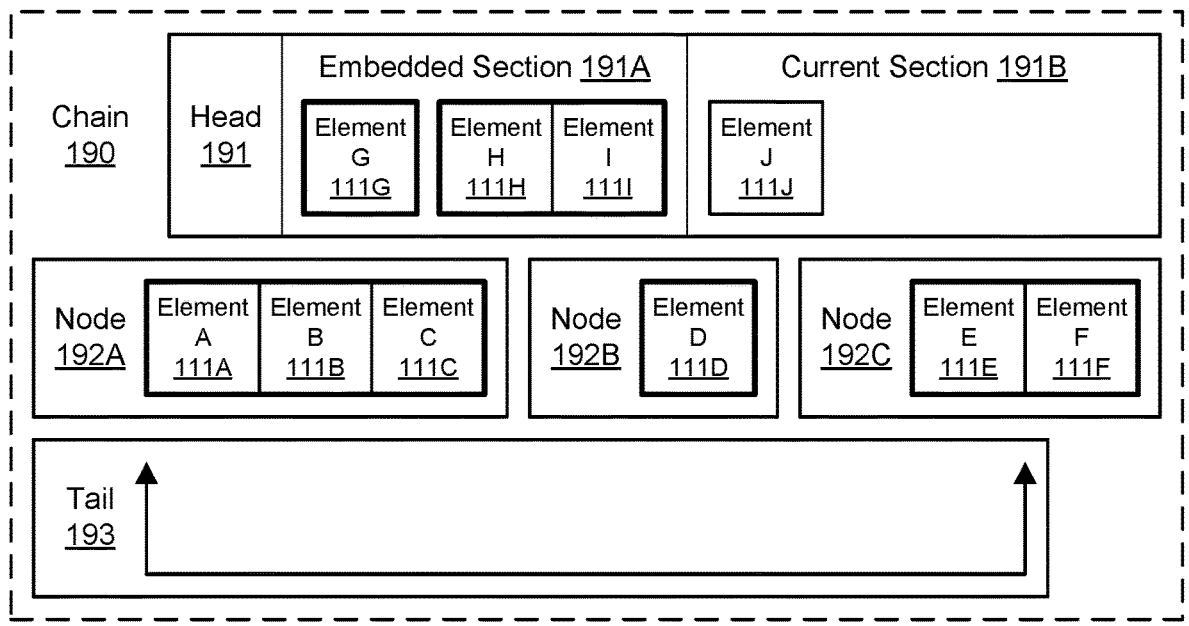

As shown in the example of FIG. 3E, a request has been received to truncate the chain from the oldest end up to a point in the interior of the chain. The request may indicate the chain identifier and the newest element to delete, e.g., element E. The elements up to and including E may be marked for deletion. The tail 193 may include two references that point to the earliest existing node (before element A in node 192A) as well as the point up to which we desire to delete (after element E in node 192C). These two references may span the point of physical deletion to the point of logical deletion in the chain. The tail may permit the tracking of a multi-step delete operation while allowing the logging system to apply an immediate bulk delete by positioning the later logical cursor at the desired position.

Figure 4A:
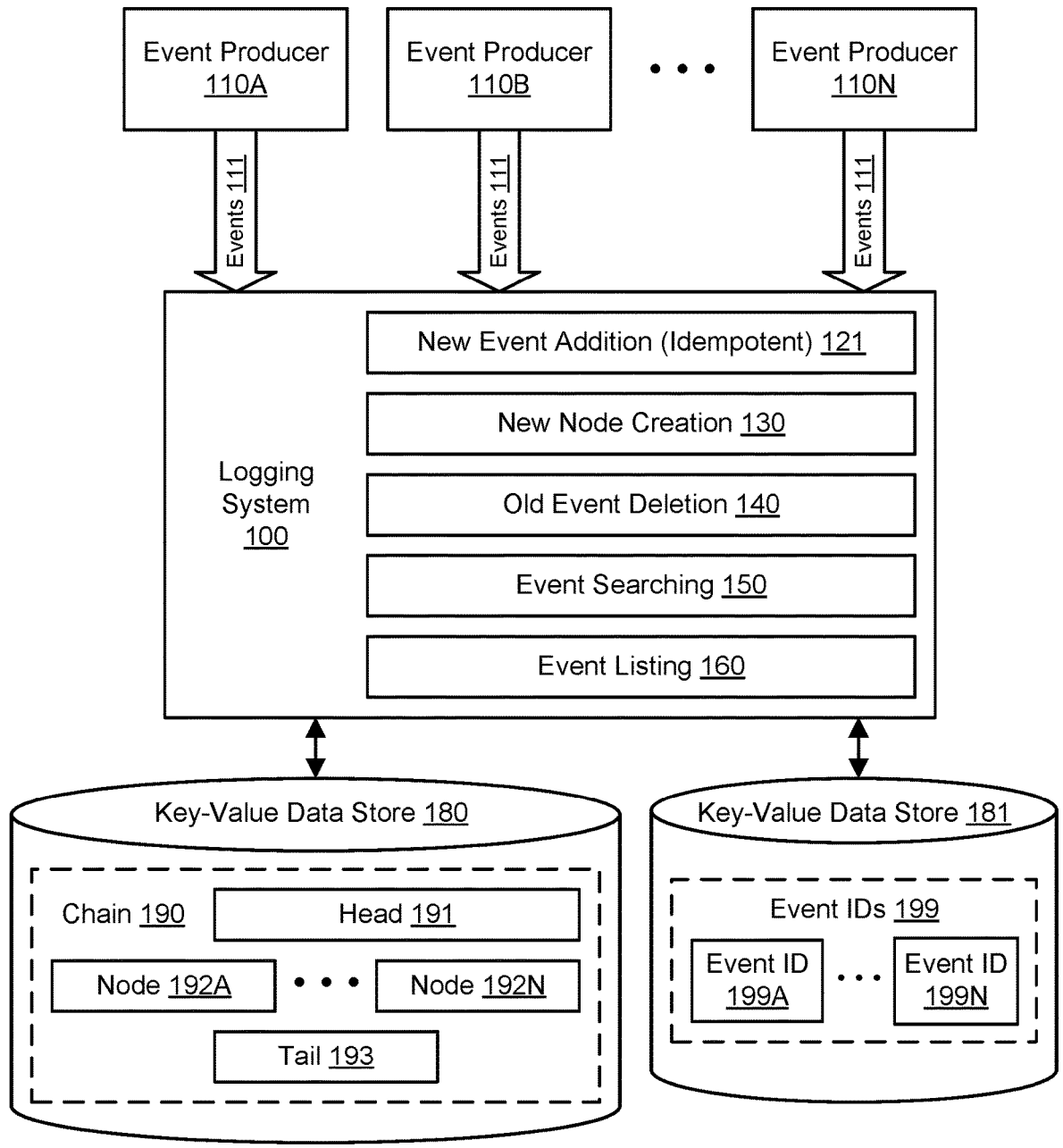
FIG. 4A illustrates further aspects of the example system environment for chain logging using key-value data storage, including an idempotence property for additions to the chain, according to one embodiment.

FIG. 4A illustrates further aspects of the example system environment for chain logging using key-value data storage, including an idempotence property for additions to the chain, according to one embodiment. In one embodiment, the logging system 100 may include a component for new event addition (with an idempotence property) 121. When an event is received by the logging system 100, the event may be supplied with an event identifier by the client, or otherwise the event identifier may be generated. In one embodiment, the event identifier may be determined as a hash of the contents of the event. A set of event identifiers 199, such as event IDs 199A-199N for past events may be stored in a key-value data store 181. In various embodiments, the data store 181 may be the same as the data store 180 used to store the chain or may be a different data store. In the key-value data store 181, the key for an event identifier may include or be derived from (e.g., as a hash of) the event identifier itself. The value associated with the key may include a pointer or other reference to the event in the chain 190, e.g., as stored in one of the nodes 192A-192N in the data store 180. In one embodiment, event identifiers for elements still stored in the head 191 may be retained in the head as well, e.g., in the current section or embedded section along with the corresponding element. In various embodiments, the idempotence property of the addition operation may be enabled or disabled per call (e.g., based on an input value to a push call) or based on a configuration setting.

The event identifiers may be used to implement an idempotence property for requests to add elements to a chain. When a request to add an element is received by the logging system 100, the new event addition component 121 may look for the event identifier for the event in the head 191 and then in the event IDs 199 in the data store 181. In one embodiment, the element may be logged to the chain only if its event identifier is not found in the head 191 or in the event IDs 199 in the data store 181. If the event identifier is found in the head 191 or in the event IDs 199, the request may be disregarded. In this manner, updates such as financial transactions, accounting transactions, order updates in a marketplace, and withdrawals from gift card balances may be logged only once to a chain.

Figure 4B:
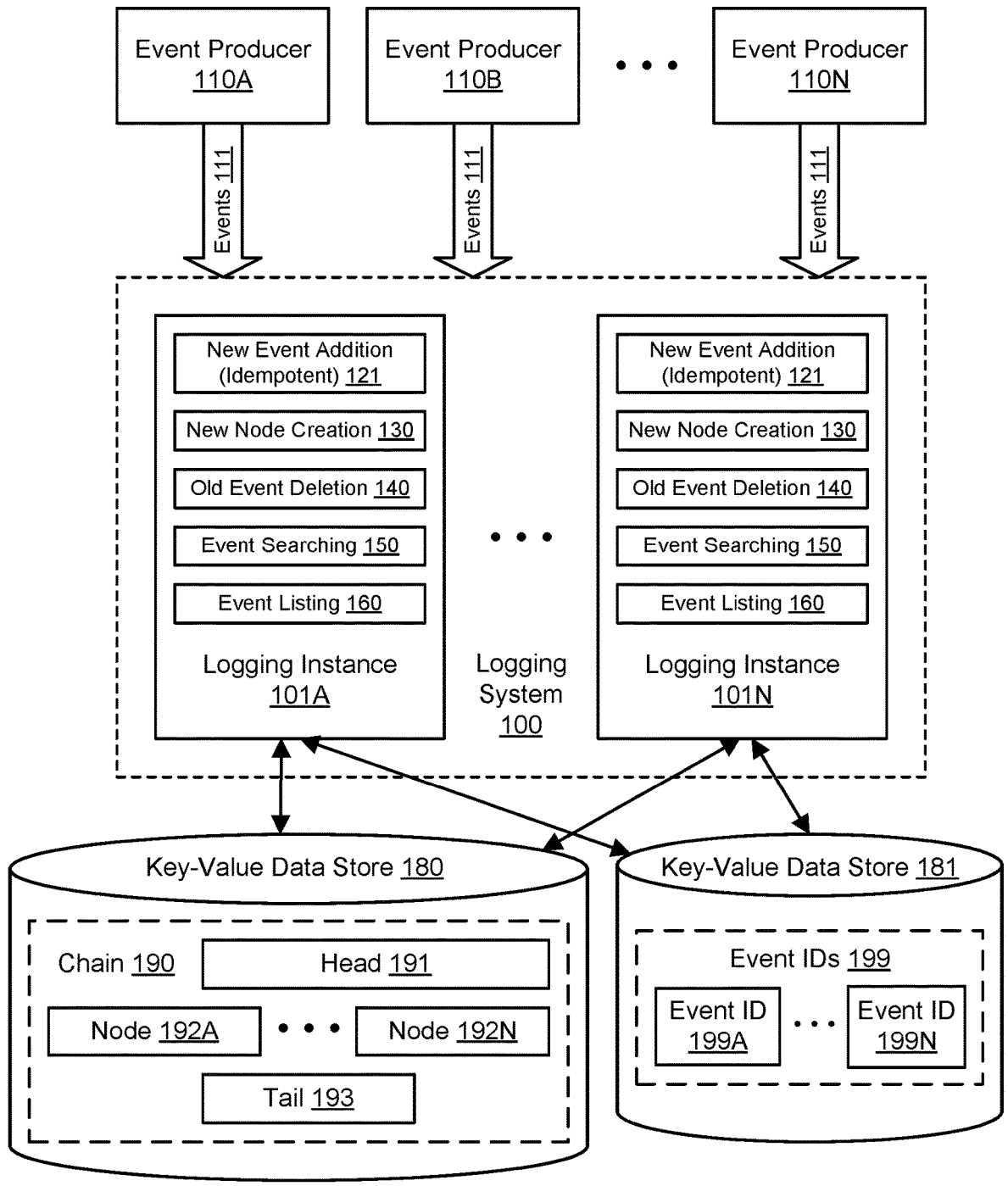
FIG. 4B illustrates further aspects of the example system environment for chain logging using key-value data storage, including a distributed set of logging instances and an idempotence property for additions to the chain, according to one embodiment.

FIG. 4B illustrates further aspects of the example system environment for chain logging using key-value data storage, including a distributed set of logging instances and an idempotence property for additions to the chain, according to one embodiment. As discussed above with respect to FIG. 1B, multiple logging instances 101A-101N may implement the component for new event addition (with an idempotence property) 121. The logging instances 101A-101N may access the chain 190 and the event identifiers 199 with a degree of concurrency.

Figure 5:
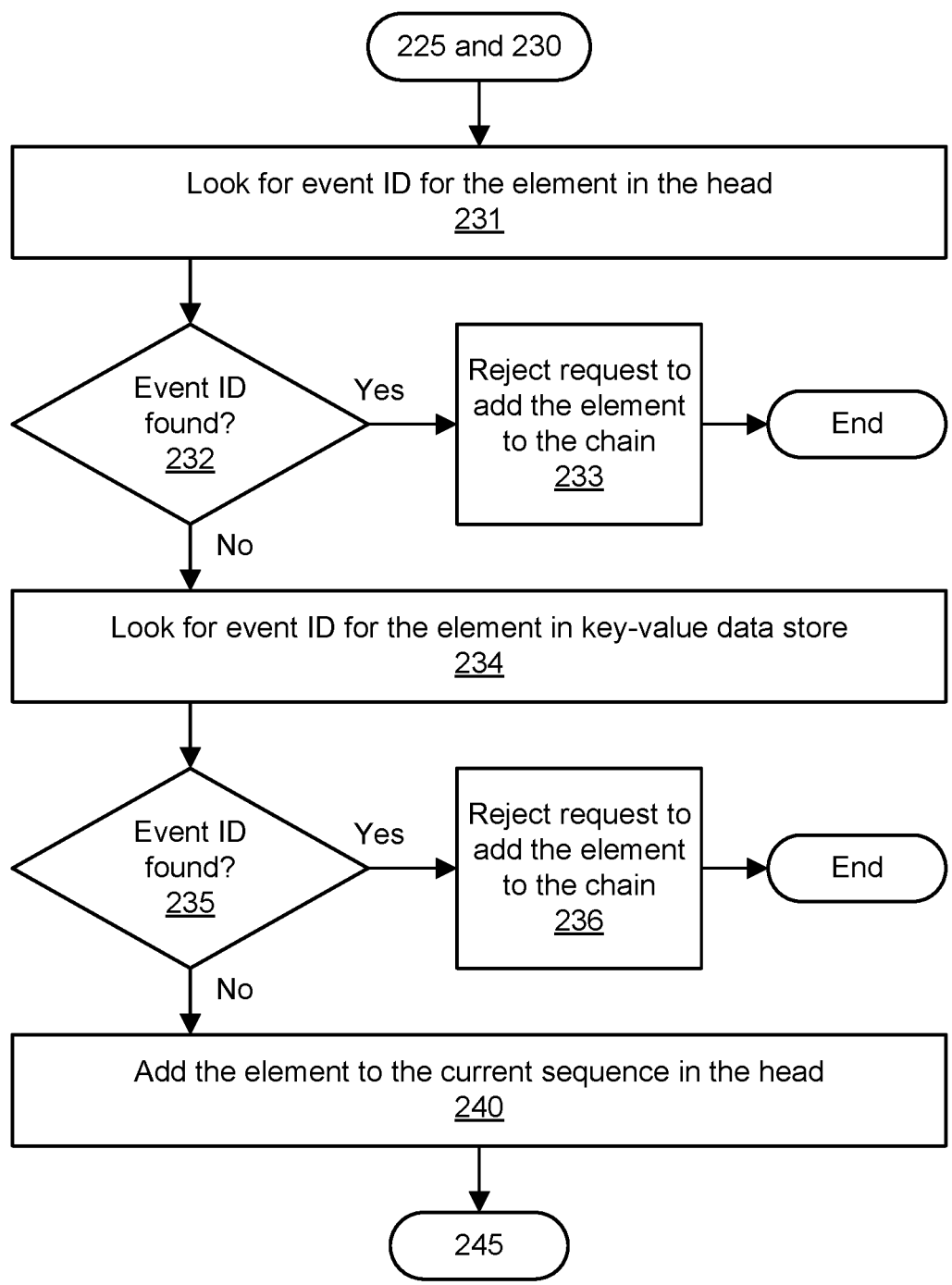
FIG. 5 illustrates further aspects of the method for adding an element to the head of a chain, including an idempotence property for additions to the chain, according to one embodiment.

FIG. 5 illustrates further aspects of the method for adding an element to the head of a chain, including an idempotence property for additions to the chain, according to one embodiment. The operations shown in FIG. 5 may be performed after the operations shown in 225 and 230 and before the operation shown in 245 as illustrated previously in FIG. 2. An event identifier may be generated for an event that a client has requested to add to a particular chain. In one embodiment, the event identifier may be determined as a hash of the contents of the event.

As shown in 231, the method may look for the event identifier in the head of the chain. As shown in 232, it may be determined whether the event identifier was found in the head of the chain. If so, then as shown in 233, the request to add the element may be rejected, and the method may end.

As shown in 234, the method may look for the event identifier in the set of event identifiers in a key-value data store. As shown in 235, it may be determined whether the event identifier was found in the set of event identifiers in the key-value data store. If so, then as shown in 236, the request to add the element may be rejected, and the method may end.

As shown in 240, if its event identifier was not found in either location, then the element associated with the request may be added to the current sequence in the head. The element may be added in an order with respect to any other elements in the current sequence, e.g., the order in which new events are received by the logging system. The new element may be associated with an element index that indicates the relative position of the element in the order.

Data Model and Application Programming Interface Examples

Figure 6:
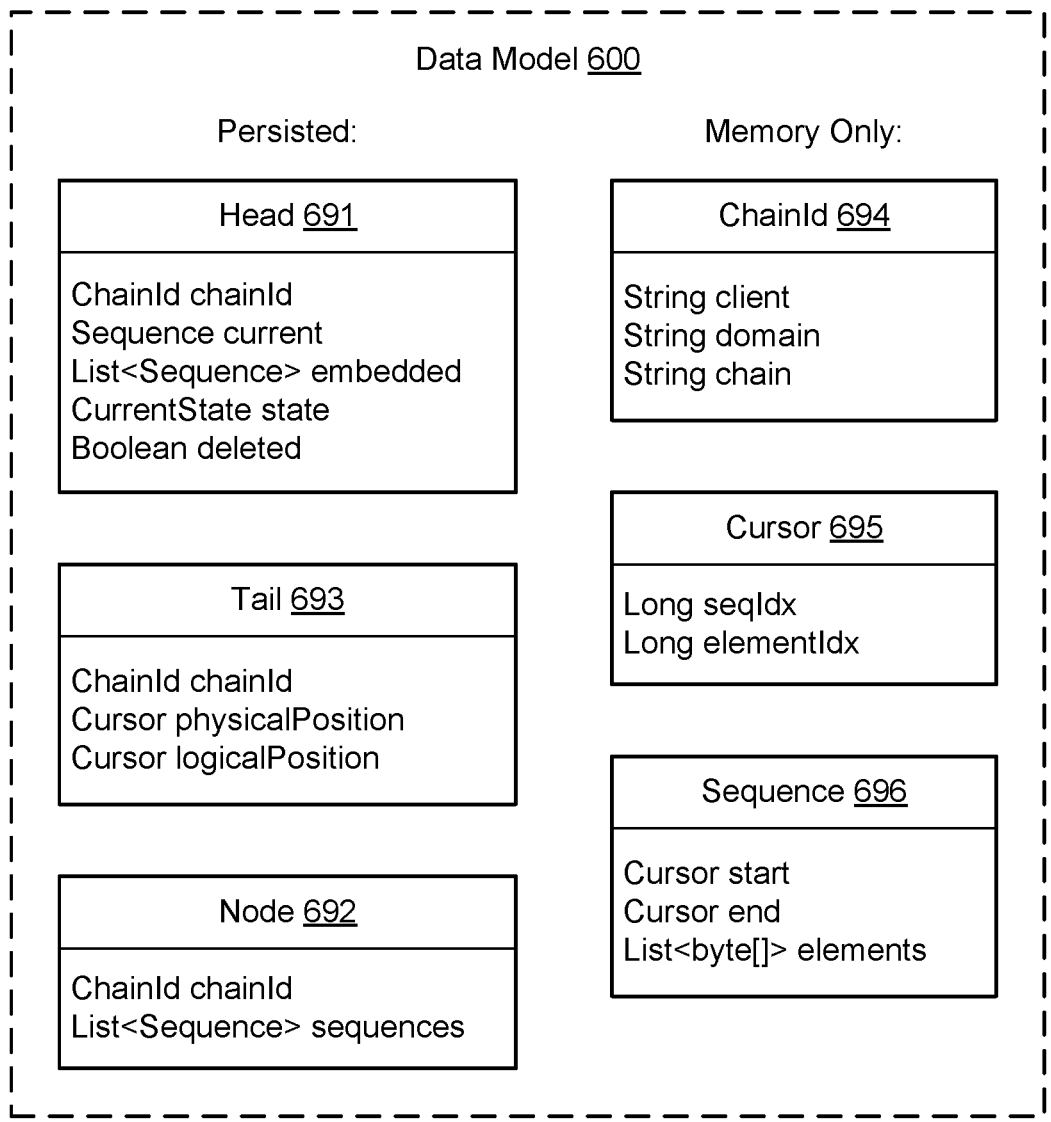
FIG. 6 illustrates an example of a data model usable for chain logging using key-value data storage, according to one embodiment.

FIG. 6 illustrates an example of a data model usable for chain logging using key-value data storage, according to one embodiment. Data structures for the head 691, tail 693, and node 692 may be persisted in the key-value data store 180. Data structures for the chainId 694, cursor 695, and sequence 696 may be maintained in non-persistent memory at a logging instance or other host that accesses the chain. The head data structure 691 may include fields for a chain identifier of type chainID, a current sequence of elements of a sequence data type, any embedded sequences of elements in a list of sequence data types, a user-defined state of type currentState, and a Boolean indicator of whether the head has been deleted. The current state may store custom information and may be passed into the push operation by the client. For example, if a chain represents updates to a gift card balance, the current state may include a numerical value representing the current balance so that the entire chain need not be traversed in order to calculate the balance at a given time. The state may be calculated and output periodically. The state field may vary in its use or meaning for chains representing different types of updates.

The tail data structure 693 may include fields for a chain identifier of type chainID, a physicalPosition pointer of type cursor, and a logicalPosition pointer of type cursor. The node data structure 692 may include fields for a chain identifier of type chainID and one or more sequences of elements in a list of sequence data types. The chain ID data type 694 may include strings identifying the client, domain, and chain. The cursor data type 695 may include long integers (or other suitable types) representing a sequence index and element index. The sequence data type 696 may include a start cursor, an end cursor, and elements as a list of byte arrays.

In one embodiment, the logging system 100 may offer an API for a push operation to add an element to a chain. The push API may accept an input of a chainID that identifies the chain to which to add elements. The push API may accept an input of List<byte[ ]> elements, where each element is an opaque byte[ ] of content. The supplied elements may be appended to the end of the chain. The elements may contain null or zero-length byte arrays. The push API may accept an input of byte[ ] conditionalContext [default=null] representing the known state of the head node obtained from a prior operation. If the head node has been altered by any mutating operation, the call may fail. If null, the operation may not be conditional and may simply append the values to the end of the chain. The push API may accept an input of Int maxLatestElements [default=0] representing the number of elements from the head of the chain that should be returned. Zero or fewer may return none. The logging system may return at most the elements that are stored in the head and have not yet been offloaded and dropped from the head node. Even though the head may contain non-contiguous segments of elements, the elements returned may be contiguous and may include all values up to those that were appended to the chain. Because the head node is retrieved prior to being updated internally by the buffer chain, there may be little overhead in returning it to the caller.

The push API may generate an output of Sequence latestElements representing the elements from the head just prior to the added elements. There may be at most 'maxLatestElements' values in this list, but no extra work of loading elements from internal nodes may need to be done. If the head contains no elements directly but has an embedded node at the end of the chain, that sequence may be returned. If there are elements directly contained in the head's current sequence, those elements will be returned. If both, the two will be combined into a joint sequence and returned. These values may be guaranteed to be contiguous and may represent the complete set of values just prior to the appended elements. The push API may generate an output of Cursor endCursor representing the position at the end of the newly added elements, where items will be added on the next push call. The push API may generate an output of byte[ ] context representing the new state of the head node which can be supplied back in the next call for a conditional operation.

The push API call may first retrieve the head of the chain. In the head may be stored a current sequence that is not yet immutable, along with any embedded sequences that are not yet offloaded to their own node. If a partition is down in storage, it may not be possible to offload some nodes. Instead of making efforts to know the status of these nodes, the logging system may simply attempt to offload them using a batch unconditional put operation. If the head node is marked isDeleted, the logging system may first call to delete the tail node to make sure that cleanup is complete before proceeding. Once that is done, the logging system may overwrite the head. For those sequences that have been successfully offloaded, the logging system may remove them from the embedded collection on the head in memory. The logging system may then add our new elements to the current sequence and increment the element index. In memory, if the elements collection exceeds a configured limit for size or count, the logging system may move the sequence to the embedded collection and start a new current sequence. Once this is done, the logging system may perform a conditional put (CPUT) of the head node back to its storage location. The cost of this operation may be 1*CGET+K*PUT+1*CPUT, where K is amortized less than 1 since on average there may be one node to offload for every push.

If the caller has supplied a conditionalContext argument that contains the entire serialized head node, the logging system may avoid the initial CGET to obtain the head node and move directly to the K*PUT offloading step. The cost tradeoff may involve returning to the caller a larger amount of information in the conditionalContext field, which may be returned back into the service in place of receiving smaller data from the client but retrieving the information from the underlying store. Since the client/service link is typically stateless and therefore cheaper than doing a quorum read from an underlying DHT, this tradeoff is typically desirable.

The offload step may be omitted in latency sensitive calls by delaying the offload and leaving the burden to a future writer. Because any writer may perform the offload step and may do so in the same manner, correctness is not impacted. However, cost and latency may increase as the head becomes larger. The offload may be executed in parallel with a head update. The head may still contain the offloaded nodes. However, if the client is chaining push requests using conditionalContext, the logging system may include in the conditionalContext whether or not it has successfully offloaded the internal nodes. This additional information may allow dropping the offloaded nodes in the subsequent request with confidence. Given these two options, the floor for a push operation may be 1*CPUT.

In one embodiment, the logging system 100 may offer an API for a pop operation to remove one or more elements from a chain. The pop operation may remove the oldest elements from the chain by popping the oldest recorded node(s). The head may be updated to reflect the new oldest elements. Because elements are laid on the chain many to a single immutable node, if the cursor is in the middle of a node, that node may not be removed but the head may be updated to reflect the offset at which the entries are valid. The pop API may accept an input of a chainId representing the identifier of the chain from which to remove data. The pop API may accept an input of Cursor removeTo representing the position in the chain up to which values will be removed. The cursor may not be null. If the cursor points beyond the latest record, then all nodes and the head may be removed, and any trace of the chain will be gone. This may result in the chain numbering additional sequences and elements from zero if it is re-created. The pop API may accept an input of byte[ ] context [default=null] representing information returned back into the routine from the prior call. This context information may help avoid extra loads from the underlying data store.

The pop API may generate an output of Boolean isComplete, which if true indicates that the pop operation has completed and left the chain in a stable state, or if false indicates that there is more work to be done to finish the job. If isComplete is false, the chain may appear to be deleted to the desired position, but some removal work may be desired. The caller may repeatedly call the pop method with the same inputs until isComplete returns true. The pop API may generate an output of byte[ ] context representing a transient state returned to the caller for more efficient subsequent calls back into the routine. The context may contain the state of the head and tail nodes so they do not need to be loaded during extensive delete operations.

The pop operation may manipulate the tail, by shifting the pointers forward and cleaning off internal nodes. First the head and tail may be loaded. If neither exists, the chain has either been successfully cleaned up or never existed. If the head does not exist but the tail does, then the logging system has reached an invalid state since it should not dispose of the head until all other data is gone. If the tail does not exist but the head does exist, then: if the head is not marked as deleted, the logging system may create a new tail that points to the 0th node; if the head is marked deleted, the logging system have achieved a complete cleanse of the internal nodes, the tail, and all that remains to be deleted is the head. If both exist, then the logging system is in the process of deleting.

The tail may contain a pointer to the earliest node that might exist (physical delete) and a pointer to the latest point in the chain that is desired to exist after the delete operation (logical delete). The pop operation may first advance the logical cursor because that has the immediate effect on readers of showing the contents removed. The next step may be to delete nodes that are between the physical and logical cursors. The logging system may choose to delete nodes in batches or one by one. A reader of the tail may not assume that the deletes are contiguous. The pop operation may strongly guarantee that the nodes are removed before finalizing the delete by advancing the physical cursor to match the logical one. When the two are the same, no additional work may need to be done to finish the pop operation. The pop result may indicate whether the chain has physically deleted all the items that are logically deleted by returning isComplete set true.

If the tail reaches the head position, meaning that there are no longer items in the chain, then the head isDeleted may be marked true. Once that is done, the tail may be deleted, followed by the head. This sequence of operations may prevent the possibility of a tail being retained after the head is gone, which may become important if the head is re-created after being deleted. The logging system may guarantee the destruction of the tail prior to the destruction of the head.

By keeping the cleanup operations strictly separate from the push operations, the logging system may avoid interfering with the more critical additions to the chain. In this manner, the logging system may prevent pop operations from slowing down modifications to the head. By placing the tail in a separate file from the head, the logging system can run both operations independently without mutual interference. By tracking logical and physical cursors, the logging system may eliminate the need for any separate garbage collection requirement to account for all of the content. The logging system may use the data structure itself to recover from partial temporary failure and guarantee eventual cleanup. To avoid doing all work in a single call, the pop routine may limit the number of physical nodes that are deleted. Because transient failure may require extensive computation or re-work, the logging system may cap the amount of rework by advancing only the physical delete pointer on the tail. If a caller wanted to delete 10,000 entries over 1,000 nodes, the logging system may immediately set the logical pointer to delete the entire set of values. Each pop operation may only delete ten nodes then advance the physical delete pointer and leave the logical pointer at the end. Once both point to the same position, the total operation is complete.

In one embodiment, the logging system 100 may offer an API for a seek operation to perform a k-ary search of a chain. The seek API may accept an input of a chainId that identifies the chain to search. The seek API may accept an input of Cursor start [default=tail of chain] representing the earliest bound for the search. The seek API may accept an input of Cursor end [default=head of chain] representing the latest bound for the search. The seek API may accept an input of int k [default=1] representing the number of nodes to load in parallel. This is equivalent to the k-ary nature of the search minus one. For example, if a value of 2 is supplied, then the chain may be split into 3 roughly equal sections and the 2 nodes bordering these sections may be loaded and returned. Any value less than 1 may treated as 1. The seek API may accept an input of byte[ ] context representing a means to supply search context back into the routine so we can avoid extra head loads.

The seek API may generate an output of List<Sequence> sequences representing the contents of the nodes. The seek API may generate an output of Cursor start [default=tail of chain] representing the earliest bound for the search inclusive. The seek API may generate an output of Cursor end [default=head of chain] representing the latest bound for the search exclusive. The seek API may generate an output of byte[ ] context representing the serialized state of the head node. When supplied back into the routine, the logging system may avoid needing to load the head node again for a number of edge cases. If the context was supplied, it may not be returned since it is expected to be identical.

In each seek operation, the logging system may aim to perform exactly one batch load from an underlying DHT. If the input does not contain an end cursor, the logging system may load the head and add its sequence to the output. The logging system may also serialize the head material into searchContext for return to the caller. If the tail is not present, the logging system may similarly load it and set the start cursor as output. If both were not set, these operations may be batch loaded. If either is not set, the logging system may do no further work for this round. When both the start and end are supplied, the logging system can perform a k-ary search over the nodes by computing the node identifiers between the supplied start and end. For instance, if the start and end were 10 and 150, and the caller supplied a k=6, then the logging system could divide (150−10=140) into 7 sections of size 20 and load nodes 30, 50, 70, 90, 110, and 130 in parallel. If some of the gets fail, the logging system may supply back what we received. If all of the gets fail, then the call fails. If searchContext was not supplied in the call, the logging system may also load the head as part of the batch and supply it back as searchContext, but not include its sequence. This context may be used to patch parts of the chain that may not be offloaded as their own nodes yet but are still embedded in the head.

In one embodiment, the logging system 100 may offer an API for a list operation to perform sequential paging of a chain. The list API may accept an input of a chainId that identifies the chain to search. The list API may accept an input of Cursor position [default=tail of chain] representing the position from which to list. The list API may accept an input of boolean forward [default=true] which, if true, lists the items starting at the position cursor between the cursor and the head (new items, forward in time) and, if false, loads the items between the cursor and the tail (older items, backwards in time). Regardless of this setting, the returned sequence may itself be ordered the same direction, with the oldest element at the front of the array. The list API may accept an input of byte[ ] context [default=null] representing a means to supply search context back into the routine so we can avoid extra head loads. The list API may accept an input of int maxNodes [default=5, max=100] representing the maximum number of nodes to return.

The list API may generate an output of List<Sequence> sequences representing the contents of the listed nodes. The list API may generate an output of byte[ ] context representing the serialized state of the head. When supplied back into the routine, the logging system may avoid needing to load the head again for a number of edge cases. If context was supplied in, it may not be returned.

In each list operation, the logging system may aim to perform exactly one batch read from the underlying DHT. If the input does not contain a position cursor, the logging system may first load the tail to determine the end of the chain. Given a position and a direction, the logging system may get the contiguous 'maxNodes' from the cursor in the direction defined by 'forward' in a batch operation from the DHT. Call failures may be re-attempted, and any missing sections may be filled in using the head. The head may have been supplied in context, but if not it may be requested as part of the batch get operation and then returned to the caller in the context field.

Illustrative Computer System

Figure 7:
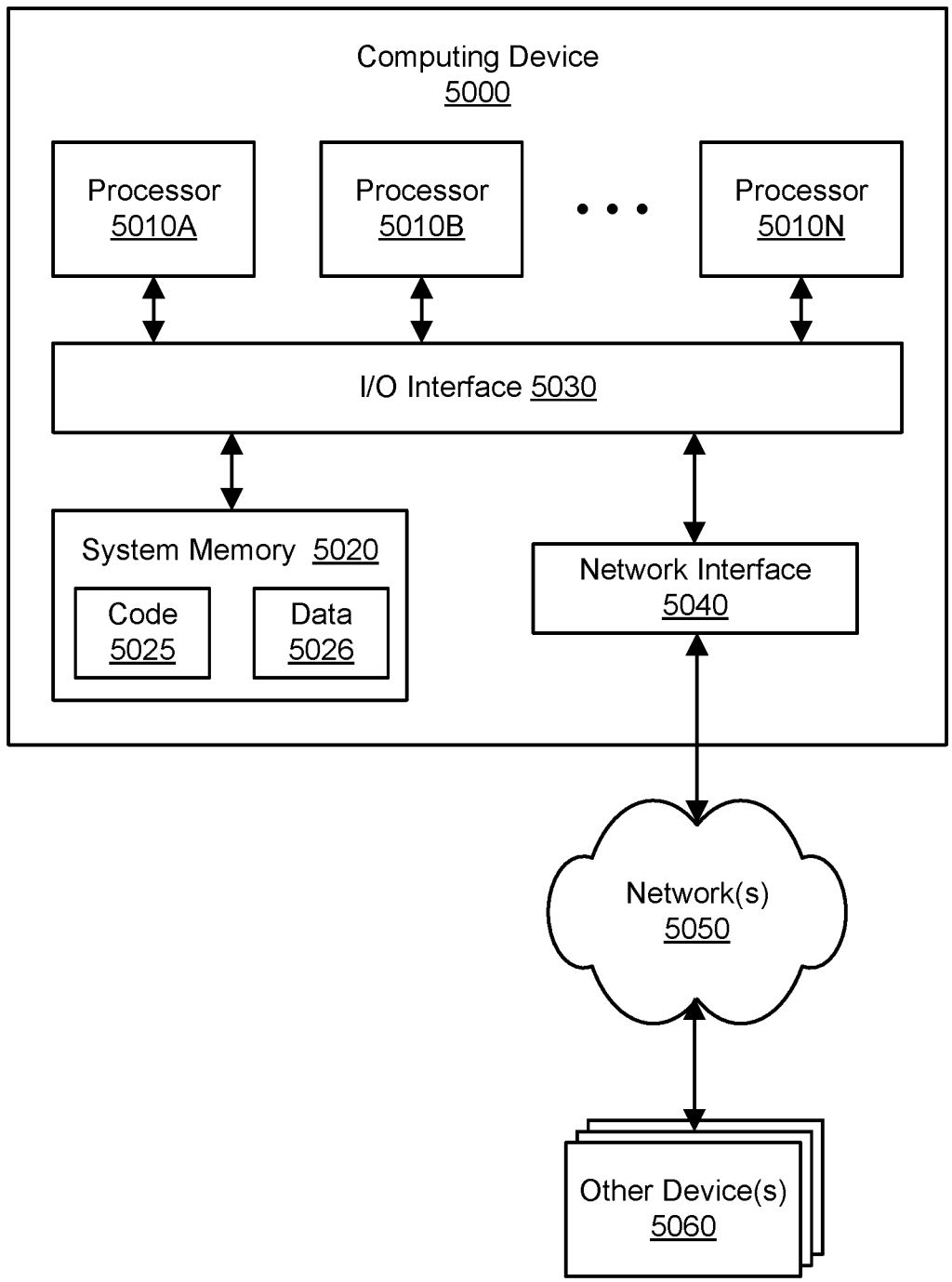
FIG. 7 illustrates an example of a computing device that may be used in some embodiments.

In at least some embodiments, a computer system that implements a portion or all of one or more of the technologies described herein may include a general-purpose computer system that includes or is configured to access one or more computer-readable media. FIG. 7 illustrates such a general-purpose computing device 5000. In the illustrated embodiment, computing device 5000 includes one or more processors 5010 (e.g., processors 5010A and 5010B through 5010N) coupled to a system memory 5020 via an input/output (I/O) interface 5030. Computing device 5000 further includes a network interface 5040 coupled to I/O interface 5030.

In various embodiments, computing device 5000 may be a uniprocessor system including one processor 5010 or a multiprocessor system including several processors 5010 (e.g., two, four, eight, or another suitable number). Processors 5010 may include any suitable processors capable of executing instructions. For example, in various embodiments, processors 5010 may be general-purpose or embedded processors implementing any of a variety of instruction set architectures (ISAs), such as the x86, PowerPC, SPARC, or MIPS ISAs, or any other suitable ISA. In multiprocessor systems, each of processors 5010 may commonly, but not necessarily, implement the same ISA.

System memory 5020 may be configured to store program instructions and data accessible by processor(s) 5010. In various embodiments, system memory 5020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 5020 as code (i.e., program instructions) 5025 and data 5026.

In one embodiment, I/O interface 5030 may be configured to coordinate I/O traffic between processor 5010, system memory 5020, and any peripheral devices in the device, including network interface 5040 or other peripheral interfaces. In some embodiments, I/O interface 5030 may perform any necessary protocol, timing or other data transformations to convert data signals from one component (e.g., system memory 5020) into a format suitable for use by another component (e.g., processor 5010). In some embodiments, I/O interface 5030 may include support for devices attached through various types of peripheral buses, such as a variant of the Peripheral Component Interconnect (PCI) bus standard or the Universal Serial Bus (USB) standard, for example. In some embodiments, the function of I/O interface 5030 may be split into two or more separate components, such as a north bridge and a south bridge, for example. Also, in some embodiments some or all of the functionality of I/O interface 5030, such as an interface to system memory 5020, may be incorporated directly into processor 5010.

Network interface 5040 may be configured to allow data to be exchanged between computing device 5000 and other devices 5060 attached to a network or networks 5050, such as other computer systems or devices as illustrated in FIG. 1, for example. In various embodiments, network interface 5040 may support communication via any suitable wired or wireless general data networks, such as types of Ethernet network, for example. Additionally, network interface 5040 may support communication via telecommunications/telephony networks such as analog voice networks or digital fiber communications networks, via storage area networks such as Fibre Channel SANs, or via any other suitable type of network and/or protocol.

In some embodiments, system memory 5020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 5000 via I/O interface 5030. A non-transitory computer-readable storage medium may also include any volatile or non-volatile media such as RAM (e.g. SDRAM, DDR SDRAM, RDRAM, SRAM, etc.), ROM, etc, that may be included in some embodiments of computing device 5000 as system memory 5020 or another type of memory. Further, a computer-readable medium may include transmission media or signals such as electrical, electromagnetic, or digital signals, conveyed via a communication medium such as a network and/or a wireless link, such as may be implemented via network interface 5040. Portions or all of multiple computing devices such as that illustrated in FIG. 7 may be used to implement the described functionality in various embodiments; for example, software components running on a variety of different devices and servers may collaborate to provide the functionality. In some embodiments, portions of the described functionality may be implemented using storage devices, network devices, or special-purpose computer systems, in addition to or instead of being implemented using general-purpose computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. In various of the methods, the order of the steps may be changed, and various elements may be added, reordered, combined, omitted, modified, etc. Various of the steps may be performed automatically (e.g., without being directly prompted by user input) and/or programmatically (e.g., according to program instructions).

Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
a data store, comprising one or more storage devices, configured to persistently store a plurality of key-value pairs; and
one or more computing devices, comprising one or more processors and corresponding memory, configured to implement a logging system, wherein the logging system is configured to:
receive data indicative of a plurality of events;
generate a chain representing the plurality of events as a plurality of log entries in chronological order, wherein the chain comprises a head and a plurality of nodes, wherein the nodes comprise data indicative of older ones of the events and offloaded from the head, and wherein the nodes are numbered sequentially;
store the head and the nodes of the chain in the data store as the plurality of key-value pairs; and
based at least in part on a request to add data indicative of a new event to the chain:
read the head of the chain from the data store, wherein the head of the chain comprises head data of one or more earlier events;
add the data indicative of the new event to the head of the chain read from the data store; and
update the head of the chain in the data store to comprise at least a portion of the one or more earlier events of the head data and the data indicative of the new event.

2. The system as recited in claim 1, wherein the head comprises data indicative of a sequence of newer events, and wherein the logging system is configured to:
generate a new node comprising the data indicative of the sequence of newer events;
store the new node in the data store;
remove the data indicative of the sequence of newer events from the head; and
update the head in the data store without the data indicative of the sequence of newer events.

3. The system as recited in claim 1, wherein the logging system is configured to:
generate a plurality of event identifiers representing the plurality of events;
store the plurality of event identifiers; and
determine that the new event is not represented in the plurality of event identifiers;
wherein the data indicative of the new event is added to the head based at least in part on determining that the new event is not represented in the plurality of event identifiers.

4. The system as recited in claim 1, wherein the logging system comprises a plurality of logging instances distributed throughout at least one network, and wherein the head is updated in the data store by at least some of the plurality of logging instances.

5. A computer-implemented method, comprising:
generating a chain representing a plurality of events in order, wherein the chain comprises a head of the chain and one or more nodes, wherein the head of the chain comprises head data of one or more earlier events, wherein the nodes comprise data offloaded from the head, and wherein the nodes are numbered sequentially;
storing the head and the one or more nodes of the chain in a persistent data store as a plurality of key-value pairs; and
based at least in part on a request to add data indicative of a new event to the chain, updating the head of the chain in the data store to comprise at least a portion of the one or more earlier events of the head data and the data indicative of the new event.

6. The method as recited in claim 5, wherein the head comprises data indicative of a sequence of newer events, and wherein the method further comprises:
generating a new node comprising the data indicative of the sequence of newer events;
storing the new node in the data store;
removing the data indicative of the sequence of newer events from the head; and
updating the head in the data store without the data indicative of the sequence of newer events.

7. The method as recited in claim 5, further comprising:
generating a plurality of event identifiers representing the plurality of events;
storing the plurality of event identifiers; and
determining that the new event is not represented in the plurality of event identifiers;
wherein the head is updated to include the data indicative of the new event based at least in part on determining that the new event is not represented in the plurality of event identifiers.

8. The method as recited in claim 5, wherein the head is updated in the data store by a plurality of logging instances distributed throughout at least one network.

9. The method as recited in claim 5, wherein updating the head comprises updating a custom field in the head representing a current state of the chain.

10. The method as recited in claim 5, wherein a key in the data store for the head is based at least in part on an identifier of the chain, and wherein keys in the data store for the one or more data nodes are based at least in part on the identifier of the chain and respective positions of the one or more nodes in the order.

11. The method as recited in claim 5, wherein the chain comprises a tail, wherein the tail comprises a pointer representing a position in the chain of physical deletion and a pointer representing a position in the chain of logical deletion, and wherein the method further comprises:
deleting from the chain an oldest remaining node; and
updating the tail.

12. The method as recited in claim 5, wherein the method further comprises:
performing a k-ary search of the chain, wherein the k-ary search divides the chain into k+1 segments and returns k nodes in the chain from boundaries between the k+1 segments.

13. One or more non-transitory computer-readable storage media storing program instructions that when executed on or across one or more processors perform:
generating a chain representing a plurality of events in chronological order, wherein the chain comprises a head of the chain and one or more nodes, wherein the head of the chain comprises head data of one or more earlier events, wherein the one or more nodes comprise data indicative of older ones of the events and offloaded from the head, and wherein the nodes are numbered sequentially;
storing the head and the one or more nodes of the chain in a persistent data store as a plurality of key-value pairs; and
based at least in part on a request to add data indicative of a new event to the chain, updating the head of the chain in the data store to comprise at least a portion of the one or more earlier events of the head data and the data indicative of the new event.

14. The non-transitory computer-readable storage media as recited in claim 13, wherein the head comprises data indicative of a sequence of newer events, and wherein the program instructions are further executed on or across the one or more processors to perform:
generating a new node comprising the data indicative of the sequence of newer events;
storing the new node in the data store;
removing the data indicative of the sequence of newer events from the head; and
updating the head in the data store without the data indicative of the sequence of newer events.

15. The non-transitory computer-readable storage media as recited in claim 13, wherein the program instructions are further executed on or across the one or more processors to perform:
generating a plurality of event identifiers representing the plurality of events;
storing the plurality of event identifiers; and
determining that the new event is not represented in the plurality of event identifiers;
wherein the head is updated to include the data indicative of the new event based at least in part on determining that the new event is not represented in the plurality of event identifiers.

16. The non-transitory computer-readable storage media as recited in claim 13, wherein the head is updated in the data store by a plurality of logging instances distributed throughout at least one network.

17. The non-transitory computer-readable storage media as recited in claim 13, wherein duplicates of event data are retained in the head and in at least some of the nodes.

18. The non-transitory computer-readable storage media as recited in claim 13, wherein a key in the data store for the head is based at least in part on an identifier of the chain, and wherein keys in the data store for the one or more data nodes are based at least in part on the identifier of the chain and respective positions of the one or more nodes in the chronological order.

19. The non-transitory computer-readable storage media as recited in claim 13, wherein the chain comprises a tail, wherein the tail comprises a pointer representing a position in the chain of physical deletion and a pointer representing a position in the chain of logical deletion, and wherein the program instructions are further executed on or across the one or more processors to perform:
deleting from the chain an oldest remaining node; and
updating the tail.

20. The non-transitory computer-readable storage media as recited in claim 13, wherein the program instructions are further executed on or across the one or more processors to perform:
performing a k-ary search of the chain, wherein the k-ary search divides the chain into k+1 segments and returns k nodes in the chain from boundaries between the k+1 segments.

* * * * *